(12) United States Patent
Li et al.

(10) Patent No.: US 10,816,969 B2
(45) Date of Patent: Oct. 27, 2020

(54) METHOD AND APPARATUS FOR CONTROLLING UNMANNED AERIAL VEHICLE

(71) Applicant: TENCENT TECHNOLOGY (SHENZHEN) COMPANY LIMITED, Shenzhen, Guangdong (CN)

(72) Inventors: Jia Iun Li, Shenzhen (CN); Kai Feng Li, Shenzhen (CN); Xiang Xin Zhang, Shenzhen (CN); Jia Wei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 255 days.

(21) Appl. No.: 15/987,117

(22) Filed: May 23, 2018

(65) Prior Publication Data
US 2018/0267532 A1    Sep. 20, 2018

Related U.S. Application Data

(63) Continuation of application No. PCT/CN2017/078804, filed on Mar. 30, 2017.

(30) Foreign Application Priority Data

Apr. 1, 2016   (CN) .......................... 2016 1 0203610

(51) Int. Cl.
*G05D 1/00* (2006.01)
*G06T 7/20* (2017.01)
(Continued)

(52) U.S. Cl.
CPC ......... *G05D 1/0055* (2013.01); *B64C 39/024* (2013.01); *G05D 1/0011* (2013.01);
(Continued)

(58) Field of Classification Search
CPC .... G05D 1/0055; G05D 1/0011; G05D 1/042; G05D 1/101; B64C 39/024
See application file for complete search history.

(56) References Cited

U.S. PATENT DOCUMENTS

2010/0215212 A1    8/2010  Flakes, Jr.

FOREIGN PATENT DOCUMENTS

| CN | 104890889 A | 9/2015 |
|---|---|---|
| CN | 104898694 A | 9/2015 |

(Continued)

OTHER PUBLICATIONS

Denuelle et al., "Snapshot-Based Control of UAS Hover in Outdoor Environments", 2015 IEEE International Conference on Robotics and Biomimetics (ROBIO), Dec. 2015, pp. 1278-1284. (Year: 2015).*

(Continued)

*Primary Examiner* — Todd Melton
(74) *Attorney, Agent, or Firm* — Sughrue Mion, PLLC (57) ABSTRACT

A method and an apparatus for controlling an unmanned aerial vehicle are provided. The method includes: detecting an abnormality occurring on the unmanned aerial vehicle in a flight process; obtaining a hover instruction in response to detecting the abnormality; and controlling, in response to the hover instruction, the unmanned aerial vehicle to hover based on the hover instruction.

20 Claims, 5 Drawing Sheets

(51) Int. Cl.
 *B64C 39/02* (2006.01)
 *G05D 1/04* (2006.01)
(52) U.S. Cl.
 CPC ............... *G05D 1/042* (2013.01); *G06T 7/20* (2013.01); *B64C 2201/145* (2013.01); *B64C 2201/146* (2013.01)

(56) References Cited

FOREIGN PATENT DOCUMENTS

| | | |
|---|---|---|
| CN | 105070005 A | 11/2015 |
| CN | 105334863 A | 2/2016 |
| CN | 105867181 A | 8/2016 |

OTHER PUBLICATIONS

Lin et al., "Monocular-Vision-Based Autonomous Hovering for a Miniature Flying Ball", Sensors (Basel, CH), vol. 15 Iss. 6, Jun. 2015, pp. 13270-13287. (Year: 2015).*
International Search Report for PCT/CN2017/078804 dated May 31, 2017 [PCT/ISA/210].

* cited by examiner

METHOD AND APPARATUS FOR CONTROLLING UNMANNED AERIAL VEHICLE

CROSS-REFERENCE TO RELATED APPLICATIONS

This application is a continuation of International Application No. PCT/CN2017/078804, filed on Mar. 30, 2017 in the Chinese Patent Office, which claims priority from Chinese Patent Application No. 201610203610.0, filed on Apr. 1, 2016 in the Chinese Patent Office, the disclosures of which are incorporated herein by reference in their entireties.

BACKGROUND

1. Field

Methods and apparatuses consistent with exemplary embodiments relate to the field of control, and more particularly, to a method and an apparatus for controlling an unmanned aerial vehicle.

2. Description of Related Art

An aircraft without a driver is referred to as an "unmanned aerial vehicle", which is an unmanned aircraft operated by a radio remote control device and a self-contained program control apparatus. When the unmanned aerial vehicle has a fault or an error in a flight process, if the unmanned aerial vehicle does not have a protection mechanism, a user needs to manually control the unmanned aerial vehicle to land or fly. However, when the unmanned aerial vehicle loses a connection to a control terminal, the unmanned aerial vehicle is in an out-of-control status, and is out of control of the user.

If the unmanned aerial vehicle has a fault in the flight process, for example, when the unmanned aerial vehicle loses a connection to the control terminal, the unmanned aerial vehicle may perform an action such as landing in situ or returning to a landing point in a straight line. However, if the unmanned aerial vehicle is located above a lake or a building, landing in situ may possibly cause the unmanned aerial vehicle to fall into the lake or crash on the building. If the unmanned aerial vehicle returns to the landing point in a straight line, an obstacle (such as a tree or a house) may possibly exist on a route (e.g., a straight air route), and the unmanned aerial vehicle may possibly collide with the obstacle. Therefore, by using this processing mechanism, the unmanned aerial vehicle is easily affected by the environment. Consequently, the unmanned aerial vehicle cannot completely execute an instruction. In addition, if the unmanned aerial vehicle loses a GPS signal in the flight process, the unmanned aerial vehicle cannot be positioned. It is very difficult and dangerous for the user to manually operate the unmanned aerial vehicle.

When an emergency occurs on the unmanned aerial vehicle, it is very difficult and unsafe for the user to manually process the emergency.

At present there is still no effective solution to the problem that the unmanned aerial vehicle cannot automatically process abnormal cases.

SUMMARY

One or more exemplary embodiments provide a method and an apparatus for controlling an unmanned aerial vehicle, to solve at least the technical problem that an unmanned aerial vehicle cannot automatically process abnormal cases in the related art.

According to one aspect of an exemplary embodiment, a method for controlling an unmanned aerial vehicle by using a computing apparatus, the computing apparatus comprising one or more processors, is provided, including: detecting, by the one or more processors, an abnormality occurring on the unmanned aerial vehicle in a flight process; obtaining, by the one or more processors, a hover instruction in response to detecting the abnormality; and controlling, by the one or more processors, in response to the hover instruction, the unmanned aerial vehicle to hover based on the hover instruction.

According to another aspect of an exemplary embodiment, an apparatus for controlling an unmanned aerial vehicle is provided, including: at least one processor operable to read the program code, and operate as instructed by the program code, said program code including: detection code configured to cause at least one of said at least one processor to detect an abnormality occurring on the unmanned aerial vehicle in a flight process; obtaining code configured to cause at least one of said at least one processor to obtain a hover instruction in response to detecting the abnormality; and control code configured to cause at least one of said at least one processor to control the unmanned aerial vehicle to hover based on the hover instruction.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

To enable a person skilled in the art to better understand the solutions, the following clearly and completely describes the technical solutions in the exemplary embodiments with reference to the accompanying drawings. Apparently, the described embodiments are merely some but not all of the embodiments of the disclosure. All other embodiments that can be obtained by a person of ordinary skill in the art based on the embodiments described herein without creative efforts shall fall within the protection scope of the disclosure.

It should be noted that in the specification, the claims, and the accompanying drawings, the terms "first", "second", and so on are intended to distinguish between similar objects, rather than indicate a specific order or a time order. It should be understood that such used data can be exchanged with each other in appropriate cases, so that the embodiments that are described herein can be implemented in a sequence other than the sequences shown in the figures or described herein. Moreover, the terms "include", "have" and any variant thereof mean to cover the non-exclusive inclusion. For example, in the context of a process, method, system, product or device that includes a series of steps or units, the process, method, system, product or device is not necessarily limited to the clearly listed steps or units, and instead, includes other steps or units not specified clearly, or may include inherent steps or units of the process, method, product, or device.

The "unit" or "module" used herein may be a hardware component such as a processor or a circuit, and/or a software component that is executed by a hardware component such as a processor.

Embodiment 1

According to an exemplary embodiment, a method for controlling an unmanned aerial vehicle is provided. It should be noted that steps shown in the flowchart of the accompanying drawings may be performed, for example, in a computer system storing computer executable instructions, and in addition, although a logic sequence is shown in the flowchart, in some cases, the shown or described steps may be performed in a sequence different from that described herein.

Figure 1:
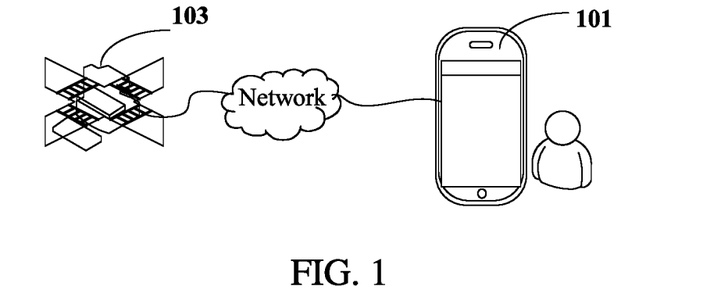
FIG. 1 is a schematic diagram of a network environment according to an exemplary embodiment.

Optionally, in an exemplary embodiment, the foregoing method for controlling an unmanned aerial vehicle may be applied to a network environment shown in FIG. 1. FIG. 1 is a schematic diagram of a network environment according to an exemplary embodiment.

The network environment includes a control terminal 101 and an unmanned aerial vehicle 103. The control terminal 101 may establish a connection to the unmanned aerial vehicle 103 by using a network (such as a wireless network like a WiFi network), and both the control terminal 101 and the unmanned aerial vehicle 103 may be provided with one or more processors (or processing chips). For example, the one or more processors may include a central processing unit (CPU).

The foregoing network includes but is not limited to: a wide area network, a metropolitan area network, or a local area network. In an exemplary embodiment, the foregoing network is a local area network. The foregoing control terminal may include a controller, a mobile terminal, or the like. Optionally, the control terminal may be a terminal device such as a mobile phone (for example, a smartphone), a tablet computer, a portable android device (PAD), or a mobile Internet device (MID).

Figure 2:
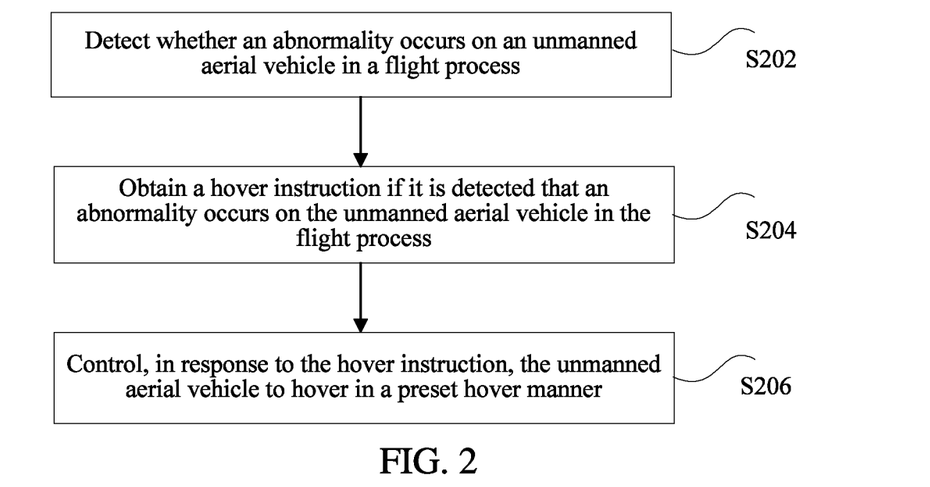
FIG. 2 is a flowchart of an optional method for controlling an unmanned aerial vehicle according to an exemplary embodiment.

FIG. 2 is a flowchart of an optional method for controlling an unmanned aerial vehicle according to an exemplary embodiment.

As shown in FIG. 2, the method includes the following steps:

Step S202: Detect whether an abnormality occurs on an unmanned aerial vehicle in a flight process.

Step S204: Obtain a hover instruction if it is detected that an abnormality occurs on the unmanned aerial vehicle in the flight process, the hover instruction being used to instruct the unmanned aerial vehicle to hover in a preset hover manner.

Step S206: Control, in response to the hover instruction, the unmanned aerial vehicle to hover in the preset hover manner. In an exemplary embodiment, when it is detected that an abnormality occurs on an unmanned aerial vehicle in a flight process (for example, an abnormality occurs on a flight status of the unmanned aerial vehicle), after a hover instruction is obtained, in response to the hover instruction, hovering is performed in a preset hover manner instructed by the hover instruction, and emergencies are automatically processed by using hardware conditions of the unmanned aerial vehicle rather than by relying on merely a user's manual operation on the unmanned aerial vehicle, thereby solving the problem in the existing technology that the unmanned aerial vehicle cannot automatically process abnormal cases. In an exemplary embodiment, whether an abnormality occurs on the flight status of the unmanned aerial vehicle in the flight process may be detected by using a flight control chip provided in the unmanned aerial vehicle. When it is detected that an abnormality occurs on the flight status of the unmanned aerial vehicle in the flight process, the hover instruction corresponding to the abnormality is obtained. The flight control chip generates, in response to the hover instruction, a control instruction for controlling the unmanned aerial vehicle to hover in the preset hover manner.

Specifically, the flight control chip may detect, by using a sensor provided in the unmanned aerial vehicle, whether an abnormality occurs on the flight status of the unmanned aerial vehicle. For example, the flight control chip detects, by using a vibration sensor, whether a vibration parameter during flight of the unmanned aerial vehicle is in a normal range. For another example, the flight control chip detects, by using a GPS sensor, whether a flight direction and a flight acceleration of the unmanned aerial vehicle are consistent with those instructed by a flight instruction.

According to an exemplary embodiment, different hover manners may be set for different abnormalities. In this manner, when it is detected that an abnormality occurs on the unmanned aerial vehicle in the flight process, after the hover instruction corresponding to the abnormality is obtained, in response to the hover instruction, a corresponding hover manner is automatically used for hovering.

When it is detected by using a sensor that an abnormality occurs on the flight status of the unmanned aerial vehicle, a corresponding hover instruction may be obtained based on a type to which the abnormality belongs, and the hover instruction is executed to control the unmanned aerial vehicle to hover at a specified location. The term "hover" refers to a flight status that the unmanned aerial vehicle is suspended in mid air.

For example, if the detected abnormality of the unmanned aerial vehicle being inconsistence between the flight direction and a direction instructed by the flight instruction belongs to the same type as the detected abnormality of the unmanned aerial vehicle being inconsistence between the flight speed and a speed instructed by the flight instruction, preset hover manners instructed by the two abnormalities are consistent.

The preset hover manner in an exemplary embodiment may be immediate hover, delayed hover, or the like.

Specifically, the controlling the unmanned aerial vehicle to hover in the preset hover manner may include: controlling the unmanned aerial vehicle to hover at the specified location in the preset hover manner.

The specified location may be a first location at which the unmanned aerial vehicle is located when the hover instruction is received, or may be a second location whose height is less than that of the first location at which the unmanned aerial vehicle is located when the hover instruction is obtained. Optionally, the controlling the unmanned aerial vehicle to hover at the specified location in the preset hover manner may include: controlling the unmanned aerial vehicle to hover at the first location in the preset hover manner, the first location being a location at which the unmanned aerial vehicle is located when the hover instruction is obtained; or controlling the unmanned aerial vehicle to hover at the second location in the preset hover manner, the height of the second location being less than that of the first location at which the unmanned aerial vehicle is located when the hover instruction is obtained.

Specifically, the flight control chip may generate the control instruction for controlling the unmanned aerial vehicle to hover at the specified location in the preset hover manner. Specifically, the specified location may be the current location at which the unmanned aerial vehicle is located at the moment when the hover instruction is received, may be the second location whose height is less than that of a current location, may be a third location instructed by the hover instruction (for example, a longitude, a latitude, and a height of the third location may be instructed by using the hover instruction), or may be a preset location corresponding to the preset hover manner.

For example, if the detected flight direction of the unmanned aerial vehicle is inconsistent with the direction instructed by the flight instruction, it is determined that an abnormality occurs on the flight status of the unmanned aerial vehicle, and the hover instruction corresponding to the abnormality is obtained. The hover instruction instructs to immediately hover the unmanned aerial vehicle at the current location at which the unmanned aerial vehicle is located (that is, the first location), and the flight control chip generates the control instruction to control the unmanned aerial vehicle to hover at the current location.

In an optional implementation, when the detected abnormality is that the unmanned aerial vehicle does not fly according to the flight instruction, or the unmanned aerial vehicle unstably flies, the hover instruction is received from the control terminal connected to the unmanned aerial vehicle.

Specifically, the controlling the unmanned aerial vehicle to hover in the preset hover manner may include: interrupting the current flight instruction executed by the unmanned aerial vehicle, and/or, setting a priority of the hover instruction to a highest priority. Then, the hover instruction is executed to hover the unmanned aerial vehicle.

In an optional implementation, when the detected abnormality is that the unmanned aerial vehicle does not fly according to the current flight instruction, obtaining the hover instruction corresponding to the abnormality includes: receiving an emergency hover instruction sent by the control terminal, the control terminal being configured to control the unmanned aerial vehicle, and the hover instruction including the emergency hover instruction.

In an optional implementation, after the sensor on the unmanned aerial vehicle detects that an abnormality occurs on the flight status of the unmanned aerial vehicle, the unmanned aerial vehicle may send an indication that an abnormality occurs on the flight status of the unmanned aerial vehicle to the control terminal. A user may send the emergency hover instruction to the unmanned aerial vehicle by using the control terminal according to the indication.

As stated above, if it is detected that the flight direction and/or the flight speed of the unmanned aerial vehicle are inconsistent with those instructed by the flight instruction, or a vibration coefficient during flight exceeds a preset rage, it is determined that an abnormal case in which the unmanned aerial vehicle does not fly according to the current flight instruction occurs on the flight status of the unmanned aerial vehicle is detected. In this abnormal case, the unmanned aerial vehicle may automatically generate the emergency hover instruction, or receive the emergency hover instruction sent by the control terminal. The emergency hover instruction is used to instruct the unmanned aerial vehicle to immediately hover at the current location (that is, the first location). In addition, if it is detected that the connection between the unmanned aerial vehicle and the control terminal is disconnected, the unmanned aerial vehicle may automatically generate the emergency hover instruction to immediately hover at the current location.

Specifically, the controlling the unmanned aerial vehicle to hover in the preset hover manner may include: interrupting the current flight instruction executed by the unmanned aerial vehicle, and/or, setting a priority of the emergency hover instruction to a highest priority; and executing the emergency hover instruction, to hover the unmanned aerial vehicle.

According to an exemplary embodiment, when uncontrollable or unstable cases occur on the unmanned aerial vehicle in the flight process, the hover instruction transmitted by the control terminal is received, so that all current operations of the unmanned aerial vehicle can be ended, and only a hover operation is performed, thereby implementing stable hovering of the unmanned aerial vehicle.

In the process that the unmanned aerial vehicle flies under control of the control terminal, cases of unstable flight, for example, shaking of the unmanned aerial vehicle, may occur on the unmanned aerial vehicle. The flight of the unmanned aerial vehicle may possibly be out of control. For example, despite the control terminal instructing the unmanned aerial vehicle to fly forward, the unmanned aerial vehicle may not fly forward. If the flight control chip of the unmanned aerial vehicle detects any of these abnormalities of the unmanned aerial vehicle, it is determined that the unmanned aerial vehicle does not fly according to the current flight instruction, or when an operator (that is, the user) of the control terminal sees that the unmanned aerial vehicle does not fly according to an instruction issued by the operator by using the control terminal, it is determined that an abnormal case occurs on the unmanned aerial vehicle in the flight process.

In an optional implementation, when the flight control chip of the unmanned aerial vehicle detects that an abnormality occurs on the unmanned aerial vehicle, the flight control chip sends the detected abnormality to the control terminal, to trigger the control terminal to generate the emergency hover instructor, or the flight control chip generates the emergency hover instruction by itself.

After receiving the emergency hover instruction, the flight control chip interrupts all flight instructions currently executed by the unmanned aerial vehicle, sets a priority of the received emergency hover instruction to a highest priority, and executes the emergency hover instruction to emergently hover the unmanned aerial vehicle at the current location.

Optionally, after receiving the emergency hover instruction, the flight control chip may empty all the flight instructions currently executed by the unmanned aerial vehicle.

Figure 3:
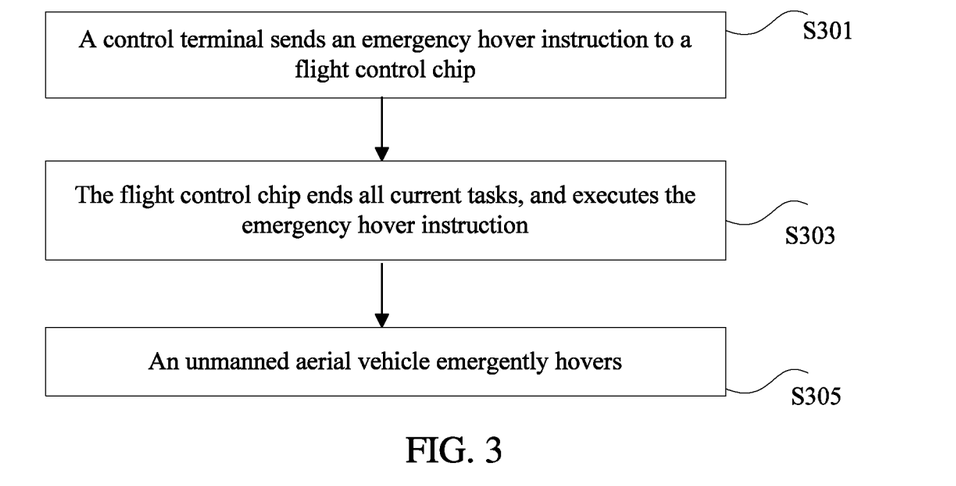
FIG. 3 is a flowchart of another optional method for controlling an unmanned aerial vehicle according to an exemplary embodiment.

As shown in FIG. 3, an exemplary embodiment may be implemented by using the following steps:

Step S301: The control terminal sends an emergency hover instruction to the flight control chip.

Step S303: The flight control chip ends all current tasks, and executes the emergency hover instruction.

Step S305: The unmanned aerial vehicle emergently hovers.

In an exemplary embodiment, when uncontrollable or unstable abnormalities occur on the unmanned aerial vehicle in the flight process, the user may use an emergency hover function of the control terminal. The control terminal sends the emergency hover instruction to the flight control chip of the unmanned aerial vehicle. After receiving the emergency hover instruction, the flight control chip of the unmanned aerial vehicle interrupts all the currently operated flight instructions, and ranks the priority of the emergency hover instruction to the highest, and immediately executes the emergency hover instruction, so as to ensure that the unmanned aerial vehicle emergently hovers in air at once, thereby avoiding accidents.

According to an exemplary embodiment, the unmanned aerial vehicle may receive the flight instruction from the control terminal connected to the unmanned aerial vehicle, and fly according to the flight instruction. In the process that the unmanned aerial vehicle flies according to the flight instruction, if the unmanned aerial vehicle loses the connection to the control terminal, the unmanned aerial vehicle needs to hover. Therefore, when the detected abnormality is that the unmanned aerial vehicle loses the connection to the control terminal, the obtaining the hover instruction corresponding to the abnormality may include: generating the hover instruction, the hover instruction being used to instruct the unmanned aerial vehicle to hover at the current location.

Optionally, the controlling the unmanned aerial vehicle to hover in the preset hover manner may include: controlling the unmanned aerial vehicle to hover at the location at which the unmanned aerial vehicle is located at the moment when the hover instruction is received (or current location). After the unmanned aerial vehicle is controlled to hover in the preset hover manner, whether a connection to the control terminal is reestablished in a preset time period is detected. If the connection to the control terminal is not reestablished within the preset time period, a returning instruction is executed, where the returning instruction is used to instruct the unmanned aerial vehicle to return to a specified returning location. The specified returning location may be a returning location preset by the user, or a takeoff location of the unmanned aerial vehicle.

In an exemplary embodiment, if the flight control chip of the unmanned aerial vehicle detects that the unmanned aerial vehicle loses the connection to the control terminal, the flight control chip automatically triggers a protection mechanism to generate the hover instruction, so that the unmanned aerial vehicle is suspended at the current location, and waits for a reconnection to the control terminal, or actively initiates a connection request, to reestablish the connection to the control terminal.

If the connection to the control terminal is reestablished within the preset time period, a normal flight status of the unmanned aerial vehicle is restored.

If the connection to the control terminal is not reestablished within the preset time period, the returning instruction is executed to control the unmanned aerial vehicle to return to the specified returning location.

Specifically, executing the returning instruction may include: detecting whether a returning point is set; if yes, controlling the unmanned aerial vehicle to return to the returning point; and if not, controlling the unmanned aerial vehicle to return to a takeoff point. The specified returning location includes the returning point and the takeoff point.

In an exemplary embodiment, after the unmanned aerial vehicle loses the connection to the control terminal, the unmanned aerial vehicle waits in situ for a reconnection by the user. When the reconnection fails, the unmanned aerial vehicle may return to the safe and unobstructed returning point (e.g., the returning point preset by the user) or takeoff point for landing, rather than return to the takeoff point by means of rectilinear flight, or directly land at the current location as in the conventional technology. According to the claimed solutions, after losing the connection to the control terminal, the unmanned aerial vehicle may land at a safe landing point. Therefore, improved security can be achieved by the claimed solutions.

Optionally, after the unmanned aerial vehicle loses the connection to the control terminal, the control terminal can also detect the loss of the connection. In response to detecting the loss of the connection to the unmanned aerial vehicle, the control terminal sends a request for reestablishing a connection and/or generates prompt information for indicating the loss of the connection to the unmanned aerial vehicle.

Figure 4:
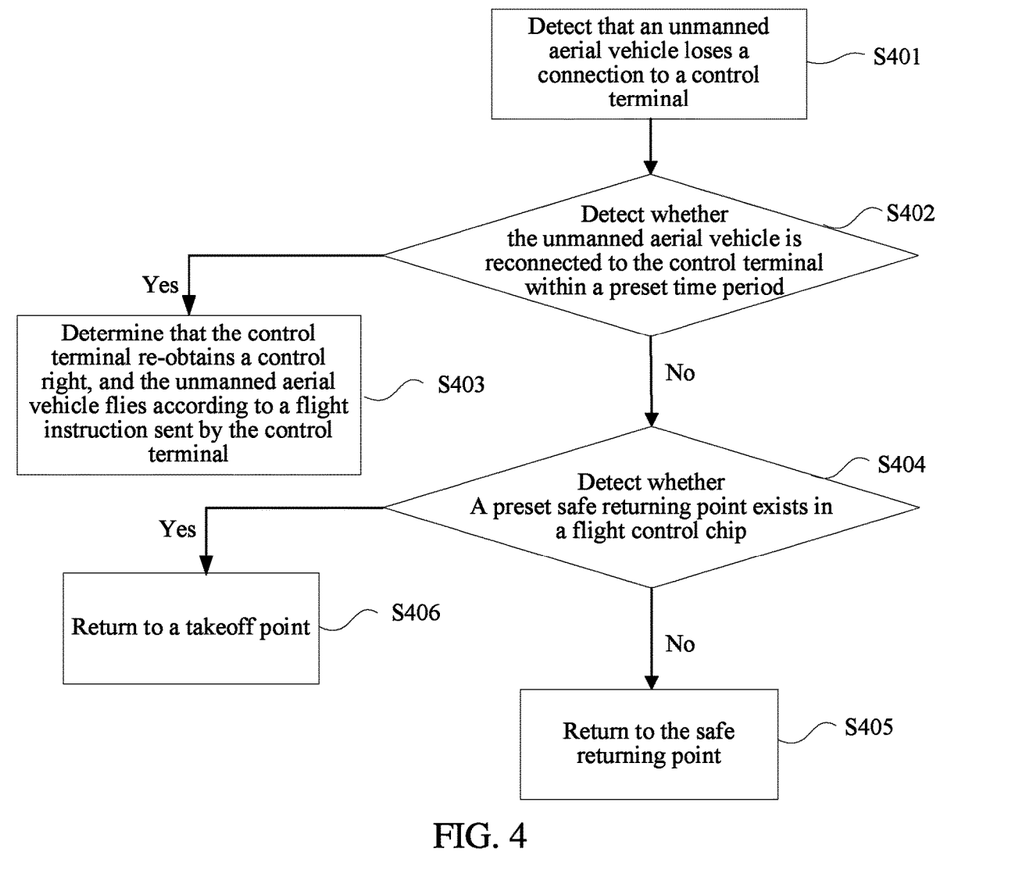
FIG. 4 is a flowchart of still another optional method for controlling an unmanned aerial vehicle according to an exemplary embodiment.

An exemplary embodiment is described in detail below with reference to FIG. 4. FIG. 4 is a flowchart of still another optional method for controlling an unmanned aerial vehicle according to an exemplary embodiment.

As shown in FIG. 4, an exemplary embodiment may be implemented by using the following steps:

Step S401: Detect that the unmanned aerial vehicle loses a connection to the control terminal.

Specifically, after it is detected that the unmanned aerial vehicle loses the connection to the control terminal, the hover instruction is generated to control the unmanned aerial vehicle to hover in situ, and step S402 is performed.

Step S402: Detect whether the unmanned aerial vehicle is reconnected to the control terminal within a preset time period.

Optionally, a connection request may be sent to the control terminal at preset time intervals. If connection confirmation information of the control terminal is received within the preset time period, it is determined that the unmanned aerial vehicle is reconnected to the control terminal within the preset time period; and otherwise, it is determined that the unmanned aerial vehicle is not reconnected to the control terminal within the preset time period.

In another optional implementation, the connection request sent by the control terminal may be passively received. If the connection request sent by the control terminal is received within the preset time period, it is determined that the unmanned aerial vehicle is reconnected to the control terminal within the preset time period; and otherwise, it is determined that the unmanned aerial vehicle is not reconnected to the control terminal within the preset time period.

Further, the flight control chip of the unmanned aerial vehicle may alternately use the active connection and passive connection manners within the preset time period, to establish the connection to the control terminal.

The preset time period may be, for example, one minute.

If the unmanned aerial vehicle is reconnected to the control terminal within the preset time period, step S403 is performed, and if the unmanned aerial vehicle is not reconnected to the control terminal within the preset time period, step S404 is performed.

Step S403: Determine that the control terminal re-obtains a control right, and the unmanned aerial vehicle flies according to a flight instruction sent by the control terminal.

Step S404: Detect whether a preset returning point (also referred to as a safe returning point) is provided by the flight control chip.

If it is detected that a preset safe returning point is not provided by the flight control chip, step S405 is performed; and if it is detected that a preset safe returning point is provided by the flight control chip, step S406 is performed.

Step S405: Return to the safe returning point.

Step S406: Return to the takeoff point.

In an exemplary embodiment, the safe returning point may be a landing location in a preset safe area of a flight area of the unmanned aerial vehicle. For example, the user sets the safe area in the flight area of the unmanned aerial vehicle, such as a grassland or a stadium.

In an exemplary embodiment, when the unmanned aerial vehicle loses the connection to the control terminal, a flight control system of the unmanned aerial vehicle automatically executes a connection loss protection mechanism of the control terminal, and waits in situ for the control terminal to be reconnected. If the control terminal is not connected for a long time (e.g., equal to or greater than a predetermined time), a returning command is executed. Because the unmanned aerial vehicle cannot identify an environment in which the unmanned aerial vehicle is located, a safe returning address set by the user during connection is executed in priority, thereby avoiding landing in water or other unfavorable environments. When the user does not set the returning address, the unmanned aerial vehicle automatically returns to the takeoff point for landing.

In another optional embodiment, when the detected abnormality is that the unmanned aerial vehicle loses a GPS signal, the controlling the unmanned aerial vehicle to hover in the preset hover manner includes: controlling the unmanned aerial vehicle to hover in a manner based on positioning by an optical flow sensor; and the obtaining the hover instruction corresponding to the abnormality may include: generate the hover instruction, where the hover instruction is used to instruct the unmanned aerial vehicle to hover in a manner based on positioning by the optical flow sensor.

In another optional embodiment, when the detected abnormality is that the unmanned aerial vehicle loses a GPS signal, in response to that the unmanned aerial vehicle loses a GPS signal, a maximum height at which the unmanned aerial vehicle is allowed to fly is set to no greater than a maximum positioning height of the optical flow sensor.

After the hover instruction is generated, the controlling the unmanned aerial vehicle to hover in the preset hover manner may include: when a current height of the unmanned aerial vehicle is greater than the maximum positioning height of the optical flow sensor, descending the unmanned aerial vehicle to a location whose height is equal to or less than the maximum positioning height of the optical flow sensor, and hovering the unmanned aerial vehicle.

Further, after descending the unmanned aerial vehicle into a positioning range of the optical flow sensor, the method may further include: setting the maximum height at which the unmanned aerial vehicle is allowed to fly to no greater than the maximum positioning height of the optical flow sensor; and after it is detected that the unmanned aerial vehicle re-obtains a GPS signal, setting the maximum height at which the unmanned aerial vehicle is allowed to fly to a preset height. The preset height is greater than the maximum positioning height of the optical flow sensor.

In an exemplary embodiment, after the unmanned aerial vehicle loses a GPS signal in the flight process, the unmanned aerial vehicle descends into an operable range of the optical flow sensor, and implements stable hovering by using the optical flow sensor.

Figure 5:
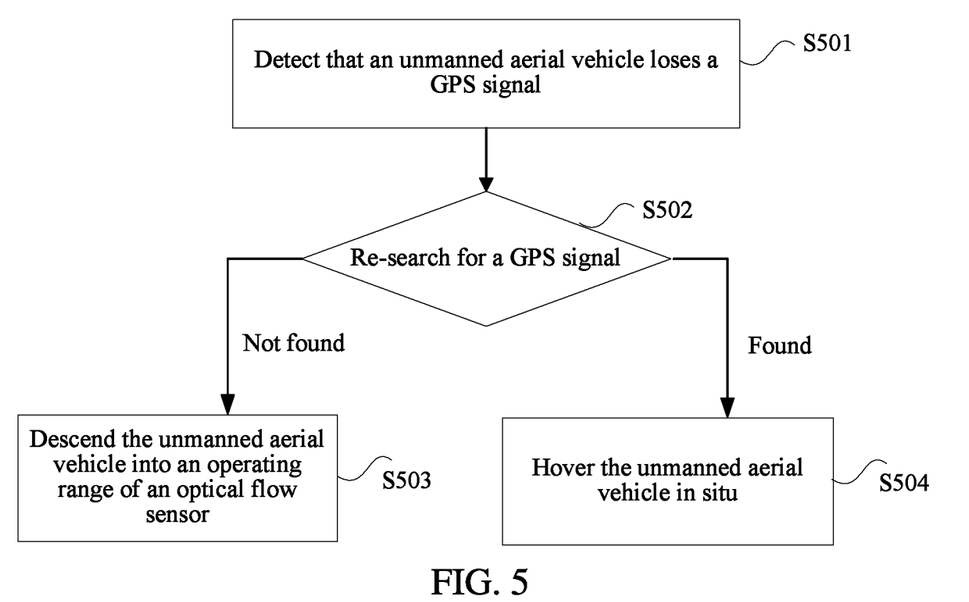
FIG. 5 is a flowchart of yet another optional method for controlling an unmanned aerial vehicle according to an exemplary embodiment.

Specifically, as shown in FIG. 5, an exemplary embodiment may be implemented by using the following steps:

Step S501: Detect that the unmanned aerial vehicle loses a GPS signal.

The flight control chip of the unmanned aerial vehicle detects that the unmanned aerial vehicle loses a GPS signal.

Step S502: Re-search for a GPS signal.

If the GPS signal is not found within a preset time period, step S503 is performed, and if the GPS signal is found within the preset time period, step S504 is performed.

Specifically, if a specified quantity of satellite signals are found within the preset time period, the GPS signal is received within the preset time period, and otherwise, the GPS signal is not received within the preset time period.

Step S503: Descend the unmanned aerial vehicle into an operating range of the optical flow sensor.

The operating range of the optical flow sensor is a height range in which the optical flow sensor can position.

Step S504: Hover the unmanned aerial vehicle in situ.

Due to lack of a GPS signal, the unmanned aerial vehicle cannot stably hover and it is difficult to operate the unmanned aerial vehicle. A user has great difficulty in manually operating the unmanned aerial vehicle, and this is unsafe. Therefore, the flight control system of the unmanned aerial vehicle starts the optical flow sensor to assist in positioning, to descend the unmanned aerial vehicle into an effective range of the optical flow sensor, thereby implementing stable hovering. The user can perform all-the-way operation. The difficulty in operation by the user is alleviated by means of stable hovering by using the optical flow sensor. In addition, in the execution process, when a GPS finds the quantity of satellites whose parameters are set, the unmanned aerial vehicle returns to a normal flight mode.

It should further be noted that when the unmanned aerial vehicle is in a mode based on positioning by the optical flow sensor, the user is not allowed to control the unmanned aerial vehicle to go beyond the effective range of the optical flow sensor, so that the optical flow sensor is ensured to be effective.

Specifically, when a user is located in an environment without a GPS signal, positioning and hovering of the unmanned aerial vehicle rely on the optical flow sensor. The flight control system locks a height at which the unmanned aerial vehicle can fly, to ensure that the height is in the effective range of the optical flow sensor, thereby avoiding cases in which a sensor fails and hovering cannot be performed.

An exemplary embodiment provides a processing mechanism of the unmanned aerial vehicle in emergencies. The processing mechanism mainly includes an emergency hovering method of the unmanned aerial vehicle, a method for processing loss of the connection between the unmanned aerial vehicle and the control terminal, a method for processing loss, by the unmanned aerial vehicle, of a GPS signal, and a method for protecting the unmanned aerial vehicle by using the optical flow sensor. By using the four methods: the emergency hovering method of the unmanned aerial vehicle, the method for processing loss of the connection between the unmanned aerial vehicle and the control terminal, the method for processing loss, by the unmanned aerial vehicle, of a GPS signal, and the method for protecting the unmanned aerial vehicle by using the optical flow sensor, safety needs of the user in a plurality of emergencies are effectively ensured, and the unmanned aerial vehicle is enabled to rapidly process emergencies in the flight process.

It should be noted that for the foregoing method embodiments, for ease of description, the method embodiments are all described with respect to a series of action combinations. However, a person skilled in the art would understand that the disclosure is not limited by a sequence of described actions because according to the disclosure, some steps may be performed in other sequences or may be simultaneously performed. Secondly, a person skilled in the art would also understand that the embodiments described in this specification are merely exemplary embodiments, and actions and modules involved in the foregoing embodiments may be omitted in other embodiments.

By means of the description of the foregoing implementation, a person skilled in the art can clearly learn that the method according to an exemplary embodiment may be implemented by means of software, general-purpose hardware platforms, and combinations thereof, and certainly, may alternatively be implemented by hardware. The method according to an exemplary embodiment may be also implemented in a form of a software product and stored in a storage medium (such as a read-only memory (ROM), random access memory (RAM), a magnetic disk, and/or an optical disc) and includes several instructions for instructing a terminal device (which may be a mobile phone, a computer, a server, a network device, or the like) to perform the methods described in the exemplary embodiments.

Embodiment 2

According to an exemplary embodiment, an apparatus for controlling an unmanned aerial vehicle is further provided.

Figure 6:
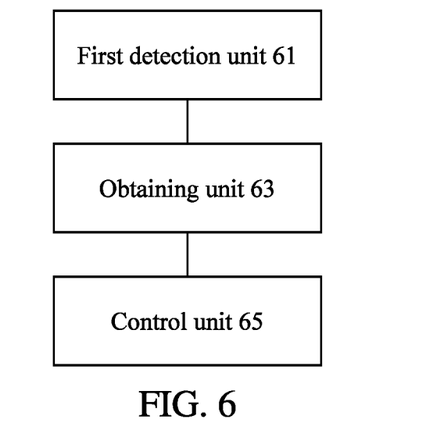
FIG. 6 is a schematic diagram of an optional apparatus for controlling an unmanned aerial vehicle according to an exemplary embodiment.

FIG. 6 is a schematic diagram of an optional apparatus for controlling an unmanned aerial vehicle according to an exemplary embodiment.

As shown in FIG. 6, the apparatus includes:

a first detection unit 61, configured to detect whether an abnormality occurs on the unmanned aerial vehicle in a flight process;

an obtaining unit 63, configured to obtain a hover instruction if it is detected that an abnormality occurs on the unmanned aerial vehicle in the flight process, the hover instruction being used to instruct the unmanned aerial vehicle to hover in a preset hover manner; and a control unit 65, configured to control, in response to the hover instruction, the unmanned aerial vehicle to hover in the preset hover manner.

According to an exemplary embodiment, when it is detected that an abnormality occurs on an unmanned aerial vehicle in a flight process (for example, an abnormality occurs on a flight status of the unmanned aerial vehicle), after a hover instruction is obtained, in response to the hover instruction, hovering is performed in a preset hover manner instructed by the hover instruction, and emergencies are automatically processed by using hardware conditions of the unmanned aerial vehicle rather than by relying on merely a user's manual operation on the unmanned aerial vehicle, thereby solving the problem in the existing technology that the unmanned aerial vehicle cannot automatically process abnormal cases.

In an exemplary embodiment, whether an abnormality occurs on the flight status of the unmanned aerial vehicle in the flight process may be detected by using a flight control chip provided in the unmanned aerial vehicle. When it is detected that an abnormality occurs on the flight status of the unmanned aerial vehicle in the flight process, the hover instruction corresponding to the abnormality is obtained. The flight control chip generates, in response to the hover instruction, a control instruction for controlling the unmanned aerial vehicle to hover in the preset hover manner.

Specifically, the flight control chip may detect, by using a sensor provided in the unmanned aerial vehicle, whether an abnormality occurs on the flight status of the unmanned aerial vehicle. For example, the flight control chip detects, by using a vibration sensor, whether a vibration parameter during flight of the unmanned aerial vehicle is in a normal range. For another example, the flight control chip detects, by using a GPS sensor, whether a flight direction and a flight acceleration of the unmanned aerial vehicle are consistent with those instructed by a flight instruction.

According to an exemplary embodiment, different hover manners may be set for different abnormalities. In this manner, when it is detected that an abnormality occurs on the unmanned aerial vehicle in the flight process, after the hover instruction corresponding to the abnormality is obtained, in response to the hover instruction, a corresponding hover manner is automatically used for hovering.

When it is detected by using a sensor that an abnormality occurs on the flight status of the unmanned aerial vehicle, a corresponding hover instruction may be obtained based on a type to which the abnormality belongs, and the hover instruction is executed to control the unmanned aerial vehicle to hover at a specified location. The term "hover" refers to is a flight status that the unmanned aerial vehicle is suspended in mid air.

For example, if the detected abnormality of the unmanned aerial vehicle being inconsistence between the flight direction and a direction instructed by the flight instruction belongs to the same type as the detected abnormality of the unmanned aerial vehicle being inconsistence between the flight speed and a speed instructed by the flight instruction, preset hover manners instructed by the two abnormalities are consistent.

The preset hover manner in an exemplary embodiment may be immediate hover, delayed hover, or the like.

Figure 7:
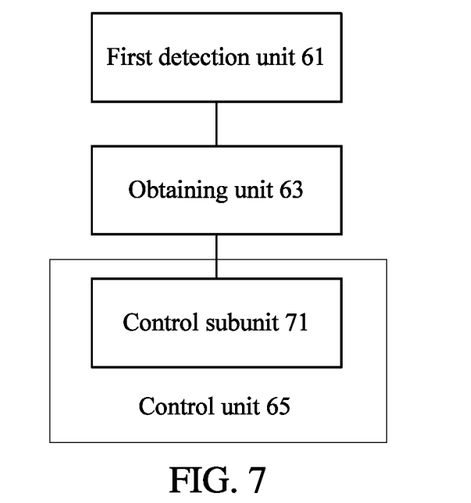
FIG. 7 is a schematic diagram of another optional apparatus for controlling an unmanned aerial vehicle according to an exemplary embodiment.

FIG. 7 is a schematic diagram of another optional apparatus for controlling an unmanned aerial vehicle according to an exemplary embodiment.

According to an exemplary embodiment, the control unit may include a control subunit 71 shown in FIG. 7, configured to control the unmanned aerial vehicle to hover at the specified location in the preset hover manner.

Specifically, the control subunit includes: a first control module, configured to control the unmanned aerial vehicle to hover at a current location in the preset hover manner, where the current location is a location at which the unmanned aerial vehicle is located when the hover instruction is obtained; or a second control module, configured to control the unmanned aerial vehicle to hover, in the preset hover manner, at a location lower than the current location, where the specified location includes the location lower than the current location.

Specifically, the flight control chip may generate the control instruction for controlling the unmanned aerial vehicle to hover at the specified location in the preset hover manner. Specifically, the specified location may be the current location at which the unmanned aerial vehicle is located at the moment when the hover instruction is received, may be a location instructed by the hover instruction, or may be a location corresponding to the preset hover manner.

According to an exemplary embodiment, the obtaining unit may include: a receiving subunit, configured to receive, when the unmanned aerial vehicle does not fly according to the flight instruction, or the unmanned aerial vehicle unstably flies, the hover instruction from a control terminal connected to the unmanned aerial vehicle.

According to an exemplary embodiment, when the abnormality is that the unmanned aerial vehicle does not fly according to the current flight instruction, the receiving subunit receives an emergency hover instruction sent by the control terminal, the control terminal being configured to control the unmanned aerial vehicle, and the hover instruction including the emergency hover instruction.

Specifically, the control unit includes: a processing subunit, configured to: interrupt the flight instruction currently executed by the unmanned aerial vehicle, and/or, set a priority of the emergency hover instruction to a highest priority; and an execution subunit, configured to execute the emergency hover instruction, to hover the unmanned aerial vehicle.

According to an exemplary embodiment, when uncontrollable or unstable cases occur on the unmanned aerial vehicle in the flight process, the hover instruction transmitted by the control terminal is received, so that all current operations of the unmanned aerial vehicle can be ended, and only a hover operation is performed, thereby implementing stable hovering of the unmanned aerial vehicle.

Specifically, when uncontrollable or unstable abnormalities occur on the unmanned aerial vehicle in the flight process, the user may use an emergency hover function of the control terminal. The control terminal sends the emergency hover instruction to the flight control chip of the unmanned aerial vehicle. After receiving the emergency hover instruction, the flight control chip of the unmanned aerial vehicle interrupts all the currently operated flight instructions, and ranks the priority of the emergency hover instruction to the highest, and immediately executes the emergency hover instruction, so as to ensure that the unmanned aerial vehicle emergently hovers in air at once, thereby avoiding accidents.

According to an exemplary embodiment, the unmanned aerial vehicle may receive the flight instruction from the control terminal connected to the unmanned aerial vehicle, and fly according to the flight instruction. In the process that the unmanned aerial vehicle flies according to the flight instruction, if the unmanned aerial vehicle loses the connection to the control terminal, the unmanned aerial vehicle needs to hover. Therefore, in an optional embodiment, the apparatus for controlling an unmanned aerial vehicle further includes a receiving unit, configured to receive the flight instruction from the control terminal connected to the unmanned aerial vehicle. The control unit is further configured to control, according to the flight instruction, flight of the unmanned aerial vehicle.

In an optional embodiment, the obtaining unit may include: a first generation subunit, configured to obtain, when the abnormality is that the unmanned aerial vehicle loses a connection to the control terminal, the hover instruction. The hover instruction is used to instruct the unmanned aerial vehicle to hover at the current location.

Figure 8:
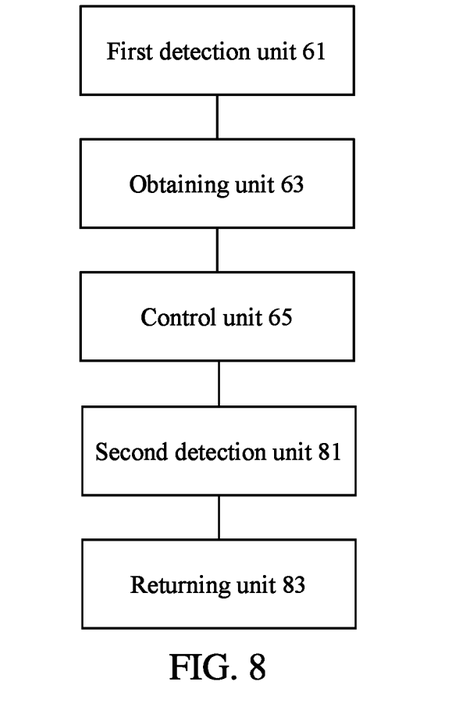
FIG. 8 is a schematic diagram of still another optional apparatus for controlling an unmanned aerial vehicle according to an exemplary embodiment.

FIG. 8 is a schematic diagram of still another optional apparatus for controlling an unmanned aerial vehicle according to an exemplary embodiment.

Specifically, the apparatus further includes a second detection unit 81 and a returning unit 83 that are shown in FIG. 8. The second detection unit 81 is configured to detect, after the unmanned aerial vehicle is controlled to hover in the preset hover manner, whether a connection to the control terminal is reestablished within a preset time period.

The returning unit 83 is configured to: if the connection to the control terminal is not reestablished within the preset time period, execute a returning instruction, where the returning instruction is used to instruct the unmanned aerial vehicle to return to a specified returning location. The specified returning location is a returning location preset by the user, or a takeoff location of the unmanned aerial vehicle.

In an exemplary embodiment, after the unmanned aerial vehicle loses the connection to the control terminal, the unmanned aerial vehicle waits in situ for a reconnection by the user. When the reconnection fails, the unmanned aerial vehicle may return to the safe and unobstructed returning point (e.g., the returning point preset by the user) or takeoff point for landing, rather than return to the takeoff point by means of rectilinear flight, or directly land at the current location as described in the conventional technology. In the solution, after losing the connection to the control terminal, the unmanned aerial vehicle may land at a safe landing point. Therefore, the security is high.

In another optional embodiment, when the abnormality is that the unmanned aerial vehicle loses a GPS signal, the control unit controls the unmanned aerial vehicle to hover in a manner based on positioning by an optical flow sensor.

Figure 9:
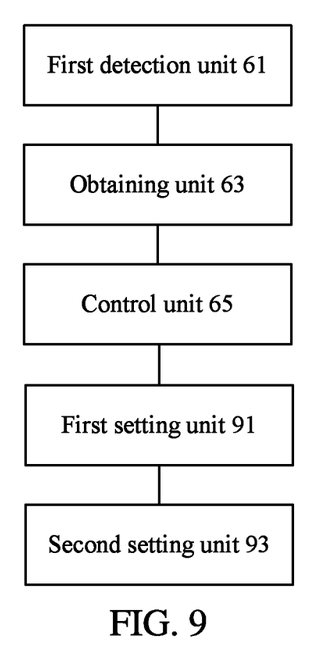
FIG. 9 is a schematic diagram of yet another optional apparatus for controlling an unmanned aerial vehicle according to an exemplary embodiment.

FIG. 9 is a schematic diagram of yet another optional apparatus for controlling an unmanned aerial vehicle according to an exemplary embodiment.

In another optional embodiment, the apparatus for controlling an unmanned aerial vehicle further includes a first setting unit 91 (as shown in FIG. 9), configured to: in response to that the unmanned aerial vehicle loses a GPS signal, set the maximum height at which the unmanned aerial vehicle is allowed to fly to no greater than a maximum positioning height of the optical flow sensor.

In another optional embodiment, the obtaining unit may include: a second generation subunit, configured to obtain, when the abnormality is that the unmanned aerial vehicle loses a GPS signal, the hover instruction. The hover instruction is used to instruct the unmanned aerial vehicle to hover in a manner based on positioning by the optical flow sensor.

Specifically, the control unit may include: a descending hover subunit, configured to: descend, when the current height of the unmanned aerial vehicle is greater than the maximum positioning height of the optical flow sensor, descend the unmanned aerial vehicle to a location whose height is equal to or less than the maximum positioning height of the optical flow sensor, and hover the unmanned aerial vehicle.

In an exemplary embodiment, when the unmanned aerial vehicle loses the connection to the control terminal, a flight control system of the unmanned aerial vehicle automatically executes a connection loss protection mechanism of the control terminal, and waits in situ for the control terminal to be reconnected. If the control terminal is not connected for a long time (e.g., equal to or greater than a predetermined time), a returning command is executed. Because the unmanned aerial vehicle cannot identify an environment in which the unmanned aerial vehicle is located, a safe returning address set by the user during connection is executed with priority, thereby avoiding landing in water or other unfavorable environments. When the user does not set the returning address, the unmanned aerial vehicle automatically returns to the takeoff point for landing.

Due to lack of a GPS signal, the unmanned aerial vehicle cannot stably hover and it is difficult to operate the unmanned aerial vehicle. A user may have a great difficulty in manually operating the unmanned aerial vehicle, and this is unsafe. Therefore, the flight control system of the unmanned aerial vehicle starts the optical flow sensor to assist in positioning, to descend the unmanned aerial vehicle into an effective range of the optical flow sensor, thereby implementing stable hovering. The user can perform all-the-way operation. The difficulty in operation by the user is alleviated by means of stable hovering by using the optical flow sensor. In addition, in the execution process, when a GPS finds the quantity of satellites whose parameters are set, the unmanned aerial vehicle returns to a normal flight mode.

Specifically, when the current height of the unmanned aerial vehicle is greater than the maximum positioning height of the optical flow sensor, the first setting unit 91 sets the maximum height at which the unmanned aerial vehicle is allowed to fly to the maximum positioning height of the optical flow sensor.

Specifically, the apparatus further includes a second setting unit 93 shown in FIG. 9, configured to set the maximum height at which the unmanned aerial vehicle is allowed to fly to a preset height after it is detected that the unmanned aerial vehicle re-obtains the GPS signal, where the preset height is greater than the maximum positioning height of the optical flow sensor.

It should further be noted that when the unmanned aerial vehicle is in the mode based on positioning by the optical flow sensor, the user is not allowed to control the unmanned aerial vehicle to go beyond the effective range of the optical flow sensor, so that the optical flow sensor is ensured to be effective.

Specifically, when a user is located in an environment without a GPS signal, positioning and hovering of the unmanned aerial vehicle rely on the optical flow sensor. The flight control system locks a height at which the unmanned aerial vehicle can fly, to ensure that the height is in the effective range of the optical flow sensor, thereby avoiding cases in which a sensor fails and hovering cannot be performed.

Methods for using the modules provided in an exemplary embodiment may be the same as the use methods provided in the method embodiment, and application scenarios may also be the same. Certainly, it should be noted that the solutions related to the modules may not be limited to the content and scenario in an exemplary embodiment, and the modules may be operated on a computer terminal or a mobile terminal, and may be implemented by using software and/or hardware.

Embodiment 3

Figure 10:
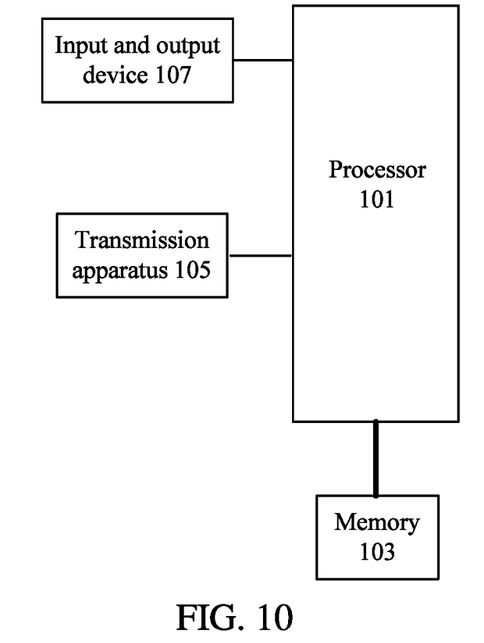
FIG. 10 is a schematic block diagram of an optional computing apparatus according to an exemplary embodiment.

FIG. 10 is a schematic block diagram of an optional computing apparatus according to an exemplary embodiment.

According to an exemplary embodiment, a computing apparatus is further provided. As shown in FIG. 10, the computing apparatus includes: one or more (only one is shown in the figure) processors 101, a memory 103, and a transmission apparatus 105. In FIG. 10, only one processor 101 is shown for illustrative purposes but the disclosure is not limited thereto.

As shown in FIG. 10, the computing apparatus may further include other devices such as an input and output device 107. The computing apparatus may be a constituent part of the unmanned aerial vehicle, that is, a component of the unmanned aerial vehicle. In an example, the computing apparatus may be a flight control chip of the unmanned aerial vehicle or is integrated with the flight control chip of the unmanned aerial vehicle.

The memory 103 may be configured to store a software program and module, for example, program instructions and/or modules corresponding to the method and apparatus for controlling an unmanned aerial vehicle according to exemplary embodiments. The processor 101 runs the software program and module stored in the memory 103, to implement various functional applications and data processing, that is, implement the foregoing method for controlling an unmanned aerial vehicle. The memory 103 may include a high-speed random access memory, and may also include a nonvolatile memory, for example, one or more magnetic storage apparatuses, flash memories or other nonvolatile solid-state memories. In some examples, the memory 103 may further include memories remotely disposed relative to the processor 101, and these remote memories may be connected to the computing apparatus through a network. Examples of the network include, but are not limited to, the Internet, an intranet, a local area network, a mobile communications network, and a combination thereof.

The transmission apparatus 105 is configured to receive or send data through a network. Specific examples of the network may include a wired network and a wireless network. In an example, the transmission apparatus 105 includes a network interface controller (NIC), which may be connected to another network device and a router through a network cable, to communicate with the Internet or a local area network. In an example, the transmission apparatus 105 is a radio frequency (RF) module, which is configured to communicate with the Internet in a wireless manner. In an example, the transmission apparatus 105 may further communicate with other components of the unmanned aerial vehicle.

Specifically, the memory 103 is configured to store an application program.

The processor is configured to perform the following steps:

Step S2: Detect whether an abnormality occurs on an unmanned aerial vehicle in a flight process.

Step S4: Obtain a hover instruction if it is detected that an abnormality occurs on the unmanned aerial vehicle in the flight process, the hover instruction being used to instruct the unmanned aerial vehicle to hover in a preset hover manner.

Step S6: Control, in response to the hover instruction, the unmanned aerial vehicle to hover in the preset hover manner.

According to an exemplary embodiment, when it is detected that an abnormality occurs on an unmanned aerial vehicle in a flight process, a hover instruction is obtained, and in response to the hover instruction, hovering is performed in a preset hover manner instructed by the hover instruction. According to an exemplary embodiment, the unmanned aerial vehicle may hover in the preset hover manner when an abnormality occurs in the flight process. Emergencies are automatically handled by using hardware conditions of the unmanned aerial vehicle rather than by relying on merely a user's manual operation on the unmanned aerial vehicle, thereby solving the problem that the unmanned aerial vehicle cannot automatically process abnormal cases in the conventional technologies.

In an exemplary embodiment, whether an abnormality occurs on the flight status of the unmanned aerial vehicle in the flight process may be detected by using a flight control chip provided in the unmanned aerial vehicle. When it is detected that an abnormality occurs on the flight status of the unmanned aerial vehicle in the flight process, the hover instruction is obtained. The flight control chip generates, in response to the hover instruction, a control instruction for controlling the unmanned aerial vehicle to hover in the preset hover manner.

The term "hover" refers to a flight status that the unmanned aerial vehicle is suspended in mid air.

Embodiment 4

An exemplary embodiment further provides a storage medium. Optionally, in an exemplary embodiment, the storage medium may be used to store program codes for performing the methods of exemplary embodiments.

Optionally, in an exemplary embodiment, the storage medium may be located in at least one network device of a plurality of network devices in the network shown in FIG. 1.

Optionally, in an exemplary embodiment, the storage medium is configured to store program codes for performing the following steps:

Step S2: Detect whether an abnormality occurs on an unmanned aerial vehicle in a flight process.

Step S4: Obtain a hover instruction if it is detected that an abnormality occurs on the unmanned aerial vehicle in the flight process, the hover instruction being used to instruct the unmanned aerial vehicle to hover in a preset hover manner.

Step S6: Control, in response to the hover instruction, the unmanned aerial vehicle to hover in the preset hover manner.

According to an exemplary embodiment, when it is detected that an abnormality occurs on an unmanned aerial vehicle in a flight process, a hover instruction is obtained, and in response to the hover instruction, hovering is performed in a preset hover manner instructed by the hover instruction. According to an exemplary embodiment, the unmanned aerial vehicle may hover in the preset hover manner when an abnormality occurs in the flight process. Emergencies are automatically handled by using hardware conditions of the unmanned aerial vehicle rather than by relying on merely a user's manual operation on the unmanned aerial vehicle, thereby solving the problem that the unmanned aerial vehicle cannot automatically process abnormal cases.

Optionally, in an exemplary embodiment, the foregoing storage medium may include but is not limited to: various media that can store program codes such as a USB flash drive, a ROM, a RAM, a removable hard disk, a magnetic disk, or an optical disc.

Optionally, reference may be made to examples described in the Embodiment 1 and Embodiment 2 for specific examples in an exemplary embodiment, and details are not described herein again.

The sequence numbers of exemplary embodiments are merely for the convenience of description, and do not imply the preference among the embodiments.

When integrated units in exemplary embodiments are implemented in a form of a software functional module and sold or used as an independent product, the units may be stored in the foregoing computer-readable storage medium. Based on such an understanding, the technical solutions essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the exemplary embodiments.

In exemplary embodiments, descriptions of the embodiments have different emphases, and for parts that are not described in detail in one embodiment, reference may be made to relevant descriptions of the other embodiments.

The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The units described as separate parts may or may not be physically separate, and the parts displayed as units may or may not be physical units, may be located at one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in the form of hardware, or may be implemented in the form of a software functional unit. The foregoing descriptions are merely exemplary and it should be noted that a person of ordinary skill in the art may further make several improvements and modifications without departing from the principle of the disclosure. These improvements and modifications should also be considered as the protection scope of the disclosure.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

According to the exemplary embodiments, when it is detected that an abnormality occurs on an unmanned aerial vehicle in a flight process, a hover instruction is obtained, and in response to the hover instruction, hovering is performed in a preset hover manner instructed by the hover instruction. According to exemplary embodiments, the unmanned aerial vehicle may hover in the preset hover manner when an abnormality occurs in the flight process. Emergencies are automatically processed by using hardware conditions of the unmanned aerial vehicle rather than by relying on merely a user's manual operation on the unmanned aerial vehicle, thereby solving the problem that the unmanned aerial vehicle cannot automatically process abnormal cases.

As above, a few embodiments have been shown and described. Exemplary embodiments and advantages are merely exemplary and are not to be construed as limiting the inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method for controlling an unmanned aerial vehicle by using a computing apparatus, the computing apparatus comprising one or more processors, comprising:
   detecting, by the one or more processors, an abnormality occurring on the unmanned aerial vehicle in a flight process, the abnormality comprising the unmanned aerial vehicle losing a global positioning system (GPS) signal;
   obtaining, by the one or more processors, a hover instruction in response to detecting the abnormality;
   controlling, by the one or more processors, in response to the hover instruction, the unmanned aerial vehicle to hover based on the hover instruction, the hover instruction being based on a positioning by an optical flow sensor;
   in response to detecting that the unmanned aerial vehicle loses the GPS signal, setting, by the one or more processors, a maximum height at which the unmanned aerial vehicle is allowed to fly to a maximum positioning height of an operating range of the optical flow sensor or less, the operating range of the optical flow sensor being a height range in which the optical flow sensor is capable of positioning; and
   in response to a current height of the unmanned aerial vehicle being greater than the maximum positioning height of the operating range of the optical flow sensor, controlling, by the one or more processors, the unmanned aerial vehicle to descend the unmanned aerial vehicle to a location whose height is equal to or less than the maximum positioning height of the operating range of the optical flow sensor, and hover the unmanned aerial vehicle after descending.

2. The method according to claim 1, further comprising:
   controlling, by the one or more processors, the unmanned aerial vehicle to hover at a first location, wherein the first location comprises a location at which the unmanned aerial vehicle is located when the hover instruction is obtained; and/or
   controlling, by the one or more processors, the unmanned aerial vehicle to hover at a second location, wherein a height of the second location is lower than a height of the first location.

3. The method according to claim 1, wherein
   the obtaining comprises:
   receiving, in response to detecting the abnormality indicating that the flight process of the unmanned aerial vehicle is not in accordance with a flight instruction, and/or the flight process of the unmanned aerial vehicle is unstable, the hover instruction from a control terminal connected to the unmanned aerial vehicle.

4. The method according to claim 3, wherein the controlling comprises:
   interrupting the flight instruction; and/or,
   setting a priority of the hover instruction to a highest priority.

5. The method according to claim 1, further comprising:
   receiving, by the one or more processors, a flight instruction from a control terminal connected to the unmanned aerial vehicle; and
   controlling, by the one or more processors, flight of the unmanned aerial vehicle according to the flight instruction.

6. The method according to claim 5, further comprising:
   in response to detecting the abnormality indicating that the unmanned aerial vehicle loses a connection to the control terminal, detecting, by the one or more processors, whether the connection to the control terminal is reestablished within a preset time period; and
   in response to detecting that the connection to the control terminal is not reestablished within the preset time period, executing, by the one or more processors, a returning instruction to instruct the unmanned aerial vehicle to return to a specified returning location.

7. The method according to claim 6, wherein the specified returning location comprises a returning location preset by a user, and/or a takeoff location of the unmanned aerial vehicle.

8. The method according to claim 1, further comprising:
   setting, by the one or more processors, the maximum height at which the unmanned aerial vehicle is allowed to fly to a preset height in response to detecting that the unmanned aerial vehicle re-obtains the GPS signal, wherein the preset height is greater than the maximum positioning height of the optical flow sensor.

9. An apparatus for controlling the unmanned aerial vehicle, comprising:
   one or more processors; and
   a memory storing program instructions, which, when executed by the one or more processors, cause the one or more processors to perform the method according to claim 1.

10. A non-transitory computer readable storage medium, comprising program instructions which, when executed by a computing apparatus, cause the computing apparatus to perform the method according to claim 1.

11. The method according to claim 1, wherein the unmanned aerial vehicle is configured to establish a connection to the computing apparatus and controlled by the one or more processors of the computing apparatus.

12. The method according to claim 11, wherein the unmanned aerial vehicle comprises a sensor configured to detect the abnormality occurring on the unmanned aerial vehicle in the flight process, and a transmission apparatus configured to transmit an indication of the abnormality to the computing apparatus.

13. The method according to claim 11, wherein, based on detection that the connection to the computing apparatus is disconnected, the unmanned aerial vehicle is configured to automatically generate an emergency hover instruction to immediately hover at a current location.

14. An apparatus for controlling an unmanned aerial vehicle, comprising:
at least one memory operable to store program code; and
at least one processor operable to read the program code, and operate as instructed by the program code, said program code including:
detection code configured to cause at least one of said at least one processor to detect an abnormality occurring on the unmanned aerial vehicle in a flight process, the abnormality comprising the unmanned aerial vehicle losing a global positioning system (GPS) signal;
obtaining code configured to cause at least one of said at least one processor to obtain a hover instruction in response to detecting the abnormality; and
control code configured to cause at least one of said at least one processor to control the unmanned aerial vehicle to hover based on the hover instruction, the hover instruction being based on a positioning by an optical flow sensor,
wherein, in response to detecting that the unmanned aerial vehicle loses the GPS signal by the detection code, the control code further causes at least one of said at least one processor to:
set a maximum height at which the unmanned aerial vehicle is allowed to fly to a maximum positioning height of an operating range of the optical flow sensor or less, the operating range of the optical flow sensor being a height range in which the optical flow sensor is capable of positioning, and
in response to a current height of the unmanned aerial vehicle being greater than the maximum positioning height of the operating range of the optical flow sensor, control the unmanned aerial vehicle to descend the unmanned aerial vehicle to a location whose height is equal to or less than the maximum positioning height of the operating range of the optical flow sensor, and hover the unmanned aerial vehicle after descending.

15. The apparatus according to claim 14, wherein said control code is further configured to cause at least one of said at least one processor to control the unmanned aerial vehicle to hover at a first location, wherein the first location comprises a location at which the unmanned aerial vehicle is located when the hover instruction is obtained, and/or control the unmanned aerial vehicle to hover at a second location, wherein a height of the second location is lower than a height of the first location.

16. The apparatus according to claim 14, wherein the program code further comprises:
receiving code configured to cause at least one of said at least one processor to receive, in response to detecting the abnormality indicating that flight of the unmanned aerial vehicle is not in accordance with a flight instruction and/or the flight of the unmanned aerial vehicle is unstable, the hover instruction from a control terminal connected to the unmanned aerial vehicle.

17. The apparatus according to claim 16, wherein the control code is further configured to cause at least one of said at least one processor to
interrupt the flight instruction and/or set a priority of the hover instruction to a highest priority.

18. The apparatus according to claim 14, wherein said program code further comprises:
receiving code configured to cause at least one of said at least one processor to receive a flight instruction from a control terminal connected to the unmanned aerial vehicle, and
wherein said control code is further configured to cause at least one of said at least one processor to control, according to the flight instruction, flight of the unmanned aerial vehicle.

19. The apparatus according to claim 18, wherein the detection code is further configured to cause at least one of said at least one processor to, in response to detecting the abnormality indicating that the unmanned aerial vehicle loses a connection to the control terminal, detect whether the connection to the control terminal is reestablished within a preset time period; and
wherein said control code is further configured to cause at least one of said at least one processor to, in response to detecting that the connection to the control terminal is not reestablished within the preset time period, execute a returning instruction to instruct the unmanned aerial vehicle to return to a specified returning location.

20. An unmanned aerial vehicle (UAV), comprising:
at least one memory operable to store program code; and
at least one processor operable to read the program code, and operate as instructed by the program code, said program code including:
detection code configured to cause at least one of said at least one processor to detect an abnormality occurring on the unmanned aerial vehicle in a flight process, the abnormality comprising the unmanned aerial vehicle losing a global positioning system (GPS) signal;
obtaining code configured to cause at least one of said at least one processor to obtain a hover instruction in response to detecting the abnormality; and
control code configured to cause at least one of said at least one processor to control the unmanned aerial vehicle to hover based on the hover instruction, the hover instruction being based on a positioning by an optical flow sensor,
wherein, in response to detecting that the unmanned aerial vehicle loses the GPS signal by the detection code, the control code further causes at least one of said at least one processor to:
set a maximum height at which the unmanned aerial vehicle is allowed to fly to a maximum positioning height of an operating range of the optical flow sensor or less, the operating range of the optical flow sensor being a height range in which the optical flow sensor is capable of positioning, and
in response to a current height of the unmanned aerial vehicle being greater than the maximum positioning height of the operating range of the optical flow sensor, control the unmanned aerial vehicle to descend the unmanned aerial vehicle to a location whose height is equal to or less than the maximum positioning height of the operating range of the optical flow sensor, and hover the unmanned aerial vehicle after descending.

* * * * *